J. K. GREER.
NUT LOCK.
APPLICATION FILED OCT. 5, 1909.

967,367.

Patented Aug. 16, 1910.

Witnesses
William C. Sinton.
O. F. Follot.

Inventor
Jackson K. Greer.

By Victor J. Evans
Attorney

UNITED STATES PATENT OFFICE.

JACKSON K. GREER, OF BERNER, GEORGIA.

NUT-LOCK.

967,367.  Specification of Letters Patent.  Patented Aug. 16, 1910.

Application filed October 5, 1909. Serial No. 521,045.

*To all whom it may concern:*

Be it known that I, JACKSON K. GREER, a citizen of the United States, residing at Berner, in the county of Monroe and State of Georgia, have invented new and useful Improvements in Nut-Locks, of which the following is a specification.

My invention relates to certain new and useful improvements in nut locks and it consists in the novel combination of parts as will be hereinafter more particularly described and pointed out in the claims.

Figure 1:
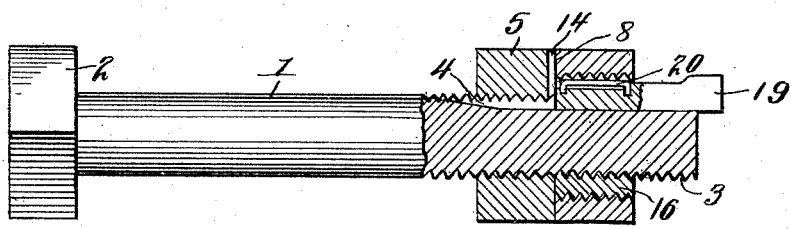
Figure 2:
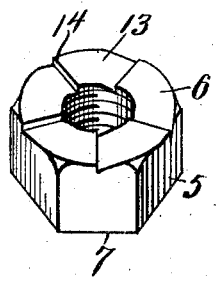
Figure 3:
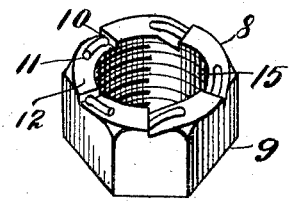
Figure 4:
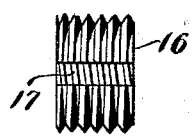
Figure 5:

Referring to the drawings forming a part of the specification: Figure 1 is a vertical longitudinal section of my complete invention with the bolt partly in side elevation showing my complete invention. Fig. 2 is a perspective view of one of the nuts which I employ in carrying out my invention. Fig. 3 is also a perspective view of the second nut which I employ. Fig. 4 is an elevation of the sleeve or thimble; and Fig. 5 is a perspective view of the key which I employ in carrying out my invention.

The object of my invention is to provide a simple, durable, and practicable construction in nut locks whereby the usual fish plates or angle bars are readily and quickly clamped to the connected ends of the rails to absolutely prevent the releasing of the several parts, and consists in the novel combination and arrangement of parts which will be hereinafter described.

Referring to the drawings 1 represents the usual bolt having the ordinary rigid head and screw threaded shank 3, the latter having a longitudinal slot 4 formed therein along its threaded portion as shown herein in Fig. 1 of the drawings.

5 represents a polygonal nut having an outer ratchet surface 6, the flat surface 7 of which is adapted to be clamped or brought to bear against the parts to be secured, said ratchet teeth being adapted to coöperate with similar ratchet teeth 8 formed upon the inner engaging surface of a similar nut 9.

Projecting from the vertical edges 10 forming the ratchet surface of the nut 9 and secured thereto in any mechanical manner are yielding arms 11 which project along the inclined surface 12 forming the said ratchet surface the vertical edges 10 coöperating with the vertical edges 14 of the nut 5 to form a lock whereby the two nuts when threaded upon the bolt are securely held together. It will be observed, owing to the disposition of the spring arms 11 these members will serve to temporarily lock the nuts together by engaging with the projections 14, when for any reason it is not desired to bring the projections 10 into engagement with the projections 14.

It is to be observed that the bore or opening 15 of the nut 9 is of larger area than the bore of the nut 5 and is provided with left handed screw threads formed upon a thimble or sleeve 16, the latter being also provided with screw threads formed in its inner periphery which are formed in a reverse direction to the threads formed upon the outside periphery of the same, the said inner screw threads being adapted to receive the threads formed upon the threaded shank of the bolt 1 and the threads formed upon the outer periphery of the thimble adapted to receive the threads formed within the nut 9. The collar 16 is provided with a longitudinal opening 17 which freely receives the engaging end 18 of the wedge or key 19.

By referring now to Fig. 1 it will be seen the wedge or key 19 has formed in one face an oblong groove, the opposite ends of which terminate in inwardly extending openings. The rod 20 is arranged within the groove and has portions adjacent to its opposite ends bent laterally and secured within the openings at the ends of the groove; the portion of the rod between the laterally bent ends is bowed outwardly and normally extends in advance of the face of the wedge or key to which it is secured, so that when the nut 9 is screwed upon the collar 16 and the wedge forced into the opening 17 the bowed portion of the rod will bind on the threads of the nut 9, whereby turning movement of the said nut will be prevented.

When the bolt 1 is passed through the several parts to be connected the nut 5 is first screwed upon the threaded shank of said bolt in the usual manner with its flat surface 7 against the parts to be united and brought in a binding position, after which the sleeve 16 is screwed upon the said bolt and brought in frictional binding contact with the said nut, and the nut 9 then screwed upon the said thimble with its ratchet teeth 8, next to the ratchet teeth 6 formed in the nut 5, thus bringing the arms 11 in yielding frictional contact with said ratchet teeth upon the nut 5. After the parts have thus been secured the key 19 is inserted within the longitudinal groove 4 formed in the bolt and also in the longitudinal opening 17 of the sleeve 16 in which operation the yielding projection surface or rod 20 carried by the key or wedge is brought in contact with the threads of the nut 8, whereby the two nuts are locked against movement in either direction.

I do not limit myself to the precise construction and arrangement of parts as herein shown and described, as the same may be varied in any respect without departing from the nature of the invention, and neither do I limit myself to the particular application of this nut lock herein shown and described to railway rails or fish plates usually employed, as it is also evident that the present construction of the nut lock may be employed in any way and to various appliances for securing the several parts in a binding position.

Having thus described my invention what I claim is:

1. A nut lock comprising a bolt having a slot or groove formed along the threaded end of the same, a nut adapted to be screwed upon said bolt, a thimble having interior and exterior screw threads formed in a reverse direction to one another and adapted to be also screwed upon the threaded end of said bolt against the nut, said thimble having an elongated opening adapted to register with the elongated slot formed in the bolt, a second nut adapted to be screwed upon said thimble and brought in binding contact with the first-named nut, and a wedge removably located within the longitudinal groove formed in the bolt and also in the elongated opening in the sleeve, the outer edge of which wedge is adapted to be brought in contact with the screw threads of the nut which is screwed upon the thimble, as and for the purpose described.

2. A nut lock comprising a bolt having a groove formed in its threaded portion, a nut adapted to be screwed upon the latter and having ratchet teeth formed upon its engaging surface, a thimble having interior and exterior screw threads formed in a reverse direction to one another and adapted to be screwed upon the threaded end of said bolt against the nut, said thimble having a longitudinal opening, a second nut adapted to be screwed upon said thimble and having ratchet teeth formed upon its engaging surface and coöperating with the ratchet teeth formed upon the first-named nut, a wedge removably received by the opening formed in the collar and groove in the bolt, and a yielding key forming a part of and carried by said wedge and adapted to come in contact with the threads formed upon the nut carried by the collar, as and for the purpose described.

In testimony whereof I affix my signature in presence of two witnesses.

JACKSON K. GREER.

Witnesses:
Y. G. CHAMBLESS,
H. W. RIVIERE.